United States Patent [19]
McGill et al.

[11] Patent Number: 4,528,000
[45] Date of Patent: Jul. 9, 1985

[54] FUEL CONDITIONING PROCESS

[75] Inventors: James C. McGill; James R. Alley; David W. Coombs, all of Tulsa, Okla.

[73] Assignee: McGill Incorporated, Tulsa, Okla.

[21] Appl. No.: 525,885

[22] Filed: Aug. 24, 1983

Related U.S. Application Data

[63] Continuation-in-part of Ser. No. 337,280, Jan. 5, 1982.

[51] Int. Cl.³ ............................................. B01D 53/04
[52] U.S. Cl. ....................................... 55/2 G; 55/58; 55/62; 55/74
[58] Field of Search ................. 48/128, 196 R; 55/23, 55/25, 26, 58, 62, 73, 74, 75; 123/1 A, 3, 27 GE; 166/267; 585/826, 827

[56]        References Cited
        U.S. PATENT DOCUMENTS

| | | | |
|---|---|---|---|
| 2,248,956 | 7/1941 | Carvlin et al. | 48/128 |
| 2,588,296 | 3/1952 | Russell, Jr. | 55/62 X |
| 3,085,380 | 4/1963 | Dillman et al. | 55/62 |
| 3,087,291 | 4/1963 | Jackson et al. | 55/62 |
| 3,182,435 | 5/1965 | Axt | 55/62 X |
| 3,300,324 | 1/1967 | Fails | 48/196 R |
| 3,594,983 | 7/1971 | Yearout | 55/62 X |
| 3,710,547 | 1/1973 | Nelson | 55/58 |
| 3,797,201 | 3/1974 | Tamura | 55/62 |
| 4,013,429 | 3/1977 | Sircar et al. | 55/58 X |
| 4,066,423 | 1/1978 | McGill et al. | 55/58 X |
| 4,285,709 | 8/1981 | Gram | 55/62 X |
| 4,303,422 | 12/1981 | Persinger | 55/319 |
| 4,305,734 | 12/1981 | McGill | 55/25 |
| 4,347,811 | 9/1982 | Lee | 55/74 X |
| 4,348,213 | 9/1982 | Armond | 55/58 X |
| 4,370,150 | 1/1983 | Fenstermaker | 55/73 X |

Primary Examiner—Robert Spitzer
Attorney, Agent, or Firm—Bill D. McCarthy

[57]        ABSTRACT

A fuel conditioning process and apparatus for use where natural gas is compressed by a field compressor driven by a natural gas powered engine. The fuel portion of the compressed raw natural gas is passed through an adsorption vessel containing an adsorbent material capable of adsorbing impurities. The outlet gas from the adsorption vessel is accumulated and mixed for averaging and controlling the heating value of the outlet gas used for fuel. Regeneration of the adsorption material, when employing multiple adsorption vessels, is accomplished by connecting one adsorption vessel to the suction side of the compressor, purified gas from another adsorption vessel in adsorption service is backflowed through the loaded adsorption vessel to desorb the previously adsorbed impurities, the flow of the compressed raw natural gas to the other adsorption vessel is terminated and the pressure within the two adsorption vessels is equalized. The regenerated adsorption vessel is then repressured with the compressed raw natural gas prior to returning it to the adsorption mode.

4 Claims, 7 Drawing Figures

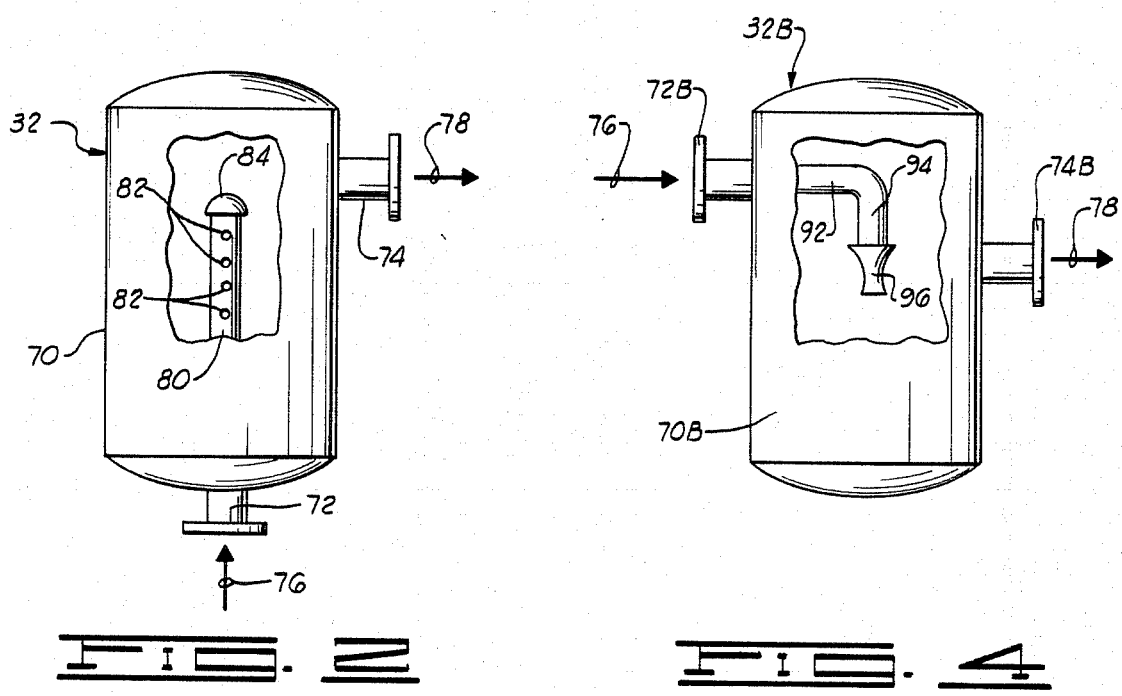

FUEL CONDITIONING PROCESS

CROSS REFERENCE TO RELATED APPLICATION

This application is a continuation-in-part to U.S. application Ser. No. 337,280, entitled "Fuel Conditioning Process and Apparatus," filed Jan. 5, 1982.

BACKGROUND OF THE INVENTION

1. Field of the Invention

The present invention relates to the field of fuel preparation devices, and more particularly but not by way of limitation, to an improved fuel conditioner to prepare raw natural gas received from an oil field reservoir.

2. Discussion

Natural gas removed from an oil field reservoir is often at insufficient pressure to provide adequate pressure energy to deliver the gas to a gathering network. Compressor units are commonly located at field sites to compress the gas for this purpose. In most instances, the compressors are operated by engines that use the reservoir gas as fuel. However, problems are often encountered with the use of reservoir gas, such as when the gas has a high or variable heating value, and when impurities such as heavy hydrocarbons or hydrogen sulfide occur in the gas makeup. The performance of compressor engines is greatly affected by the heating quality of the fuel; and reservoir gas impurities can result in damage to the engines, leading to high maintenance cost and frequent replacement. The service life and performance quality of compressor engines running on raw reservoir gas is unpredictable at best.

The term impurities, as used in the present disclosure, refers to compounds which are detrimental to the best performance of internal combustion engines. These compounds may be corrosive or may affect the detonation characteristics of the fuel.

SUMMARY OF THE INVENTION

The present invention provides a fuel conditioning process in which reservoir gas is passed through a vessel containing an adsorbent material capable of selectively adsorbing impurity compounds present in the reservoir gas to produce an outlet gas stream useful as fuel for an internal combustion engine which, in the operating mode thereof, powers a gas compressor.

In one aspect the fuel conditioning process of the present invention comprises the steps of passing the fuel portion of the compressed raw reservoir gas stream through a first adsorption vessel containing an adsorbent material capable of selectively adsorbing impurity compounds present in the raw reservoir gas stream to produce an outlet gas stream suitable for fuel; passing the outlet gas stream as fuel to an internal combustion engine which powers a gas compressor; terminating the passage of the reservoir gas to the first adsorption vessel after achieving a predetermined degree of saturation of the adsorption material; passing the fuel portion of the compressed raw reservoir gas stream through a second adsorption vessel containing an adsorbent material capable of selectively adsorbing the impurity compounds to produce an outlet gas stream; and passing the outlet gas stream from the second adsorption vessel as fuel to the internal combustion engine. Regeneration of the adsorbent material in the first adsorption vessel is achieved (after the first adsorption vessel has been isolated from the raw reservoir gas stream) by connecting the first adsorption vessel to the compressor inlet so that the pressure in the first adsorption vessel is lowered; backflowing a portion of the outlet gas from the second adsorption vessel through the first adsorption vessel for a period of time sufficient to substantially desorb impurities from the adsorbent material in the first adsorption vessel; terminating the backflowing of the outlet gas stream through the first adsorption vessel and partially repressuring the first adsorption vessel with a portion of the outlet gas from the second adsorption vessel; terminating the flow of the outlet gas stream from the second adsorption vessel to the first adsorption vessel; substantially equalizing the pressure in the first and second adsorption vessels; and passing the compressed raw reservoir gas stream to the regenerated first adsorption vessel.

It is an object of the present invention to provide an apparatus and process to substantially purify and control the heating value of raw reservoir gas so as to provide improved fuel gas quality for use in internal combustion engines.

Another object of the present invention, while achieving the above stated object, is to provide an apparatus and process which requires a minimum of investment per installation.

Yet another object of the present invention, while achieving the above stated objects, is to provide an apparatus which is highly reliable and which will operate with minimal service.

Other objects, features and advantages of the present invention will become clear upon reading the following detailed description in conjunction with the drawings and appended claims.

BRIEF DESCRIPTION OF THE DRAWINGS

FIG. 2 is a partial cutaway, elevational view of a volume accumulator vessel.

FIG. 4 is a partial cutaway, elevational view of yet another embodiment of a volume accumulator vessel.

FIG. 6 is a schematic flow diagram of another embodiment of a fuel conditioning process for the practice of the present invention.

DESCRIPTION

Figure 1:
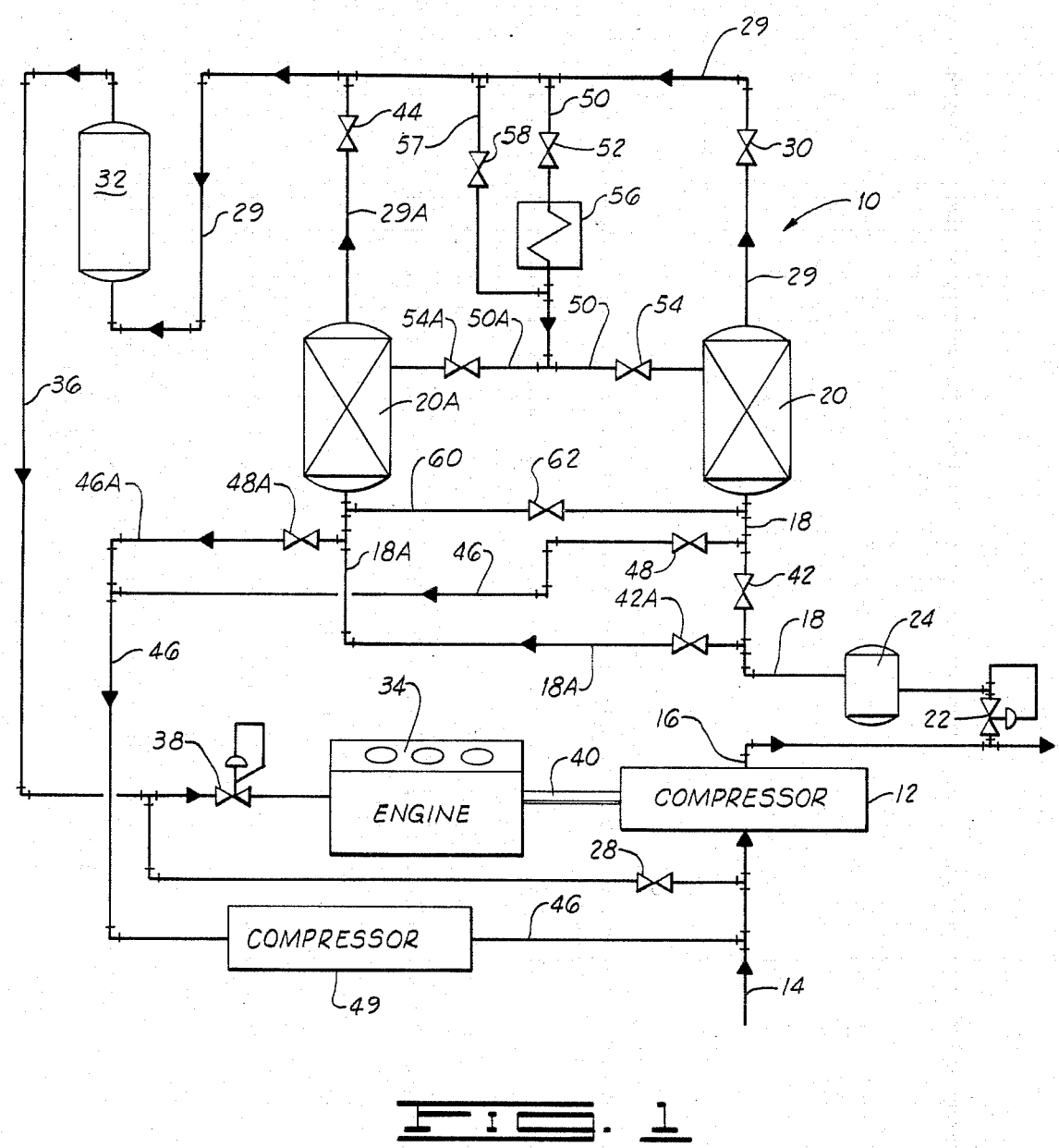
FIG. 1 is a schematic flow diagram of a fuel conditioning process for the practice of the present invention.

Referring to FIG. 1, shown therein is a schematic flow diagram of the fuel conditioning process 10 of the present invention. The fuel conditioning process 10 provides a means to purify the fuel for internal combustion engines which burn natural gas as fuel. In a typical field installation, natural gas from an earth reservoir is produced and gathered by a gas gathering network. A compressor compresses a raw reservoir gas stream and feeds the compressed gas stream to a gas gathering conduit at a predetermined discharge pressure.

The engine that powers the field compressor will normally be fueled by a portion of the reservoir gas as it is taken from the ground. This reservoir gas has usually not been processed for the removal of impurities, and as pointed out above, the engine using raw reservoir gas is subjected to severe problems such as improper combustion or corrosion. Impurities include heavy hydrocarbons and hydrogen sulfide, which can be detrimental to engine performance and affect the heat content (usually stated in the number of BTU's per standard cubic foot) of the reservoir gas. The heating content of the raw gas can vary considerably from site to site, and for that matter, from time to time at the same site.

The process of the present invention serves to remove such impurities from the fuel portion of the reservoir stream, thereby reducing maintenance down time for the engine, while also providing a more uniform and higher quality fuel.

In FIG. 1, raw natural gas at a relatively low pressure enters a compressor 12 via a conduit 14. This gas is compressed to a predetermined discharge pressure and exits the compressor 12 via a conduit 16. A portion of compressed gas is withdrawn via a conduit 18 and flows to a first adsorption vessel 20. If required, a pressure reducing regulator 22 and a knockout drum 24 may be interposed in the conduit 18 to control the pressure of the gas to the first adsorption vessel 20 and to collect entrained liquids in the compressed gas in order to prevent liquids from being carried into the first adsorption vessel 20.

In some installations, it may be desirable to have the capability to operate the engine using raw reservoir gas as fuel. Where reservoir pressure is sufficient, a bypass conduit 26 may be connected between the conduit 14 and the engine. A valve 28, provided in the bypass conduit 26, is normally closed except when the fuel portion is to bypass the compressor 12, and the pressure reducing regulator 22, provided in the conduit 18, is normally operative except when it is desired to open the valve 28 and operate the engine on raw reservoir fuel gas.

The fuel portion of raw reservoir gas passes through the first adsorption vessel 20 and passes therefrom via a conduit 29 as a substantially pure outlet gas stream suitable for use as fuel for an internal combustion engine. The first adsorption vessel 20 is of conventional design for holding a solid adsorbent material, typically activated carbon, capable of selectively adsorbing heavy hydrocarbon components and other impurities, such as hydrogen sulfide, from the raw natural gas derived from the ground reservoir. A valve 30 is provided in the conduit 29 and is normally open during the adsorption cycle of the first adsorption vessel 20, with the outlet gas stream passing via the conduit 29 to a volume accumulator vessel 32 which serves to accumulate and mix the purified outlet gas stream. The accumulator effluent flows to an engine 34 as fuel via a conduit 36 which has at least one fuel regulator 38 of conventional design to regulate the flow rate as required to power the engine 34. The engine 34 is power connected to the compressor 12 via a drive shaft 40. As shown, the bypass conduit 26 is connected to the conduit 36 upstream of the fuel regulator 38.

In like manner to the first adsorption vessel 20 described hereinabove, a second adsorption vessel 20A is also provided with identical adsorbent material as that disposed in the first adsorption vessel 20. The second adsorption vessel 20A is connected to the conduit 18 via a conduit 18A. Valves 42 and 42A are disposed in the conduits 18 and 18A, respectively, to selectively isolate the first and second adsorption vessels 20, 20A as may be desired. The second adsorption vessel 20A is identical to the first adsorption vessel 20 and need not be described further except to note that a purified outlet gas stream exiting therefrom can pass via a conduit 29A to the conduit 29 and thereby to the volume accumulator vessel 32. Valves 30 and 44 are disposed in the conduits 29 and 29A, respectively, to selectively isolate the first and second adsorption vessels 20 and 20A as required for cyclic adsorption and regeneration service.

Additional adsorption vessels, like those depicted as 20 and 20A, can be provided in the fuel conditioning process 10 and operated in various cyclic combinations to provide sufficient adsorption capability, and such units can be combined in series or parallel flow as may be desired. Of course, the size of the first and second adsorption vessels 20, 20A can also be varied to accommodate the reservoir flow and the compressor and engine fuel requirements so that a constant flow of purified outlet gas from actively adsorbing adsorption beds can be achieved.

Natural gas which flows from the first adsorption vessel 20 will vary in composition during the adsorption cycle—from beginning at a time when the first adsorption vessel 20 is first placed into its adsorption mode until the adsorbent material in the first adsorption vessel 20 begins to approach saturation. Typically, the net heat content of the purified outlet gas stream, having been stripped of its higher molecular weight hydrocarbon components by the adsorption material in the first adsorption vessel 20, may vary, for example, from 950 BTU per SCF to 1050 BTU per SCF as it leaves the first adsorption vessel 20. This wide variation in fuel heat content will result in poor engine performance. This variation can be reduced to less than 25 BTU per SCF by the accumulation and mixing achieved by the volume accumulator vessel 32, which will be described more fully below. Generally, the more adsorbers used, the smaller that the volume accumulator vessel 32 need be, and conversely, a larger volume accumulator vessel 32 is called for if only one adsorber is used. If sufficient mixing occurs in the conduits or if several adsorbers are used, it may be possible to eliminate the volume accumulator vessel, but only where sufficient volume is held in the conduits to supply the fuel requirements and regeneration requirements in the manner of regeneration described below.

Regeneration of the adsorbent material in the first and second adsorption vessels 20, 20A is accomplished by pressure reduction, purging with purified outlet gas and partial repressurization with purified outlet gas. A conduit 46 is connected to the conduit 18 downstream of the valve 42, the distal end of the conduit 46 being connected to the conduit 14 to provide fluid communication between the first adsorption vessel 20 and the inlet to the compressor 12. In like manner, a conduit 46A is connected to the conduit 18A downstream of the valve 42A and connects with the conduit 46 so as to provide fluid communication between the second adsorption vessel 20A and the inlet to the compressor 12. Valves 48 and 48A are disposed respectively in the conduits 46 and 46A, the valve 48 being closed when the first adsorption vessel 20 is in its adsorption mode, and the valve 48A being closed when the second adsorption vessel 20A is in its adsorption mode. If desired, a compressor 49 can be disposed in the conduit 46 for compressing the gases flowing therethrough to a predetermined pressure to assist in the flow of such gases to the compressor 12. The compressor 49 can be driven by a separate power source (not shown), or it can be incorporated into the drivetrain provided by the engine 34 and drive shaft 40 so that it is driven simultaneously with the compressor 12.

For regeneration of the first and second adsorption vessels 20, 20A, a conduit 50 is connected to the conduit 29 and to the first adsorption vessel 20 to provide fluid communication therebetween for selective backflowing of purified outlet gas into the first adsorption bed vessel 20 during the purging step of the regeneration of the adsorbent material contained therein. Valves 52 and 54 are interposed in the conduit 50 and are normally closed during the adsorption cycle of the first adsorption vessel 20. In like manner, a conduit 50A, having a valve 54A, connects between the conduit 50 and the second adsorption vessel 20A to provide fluid communication to the second adsorption vessel 20A so that selective backflowing of purified outlet gas into the second adsorption vessel 20A during the purging step of the regeneration of the adsorbent material contained therein. The valve 54A is normally closed during the adsorption cycle of the second adsorption vessel 20A. A heater 56 may be interposed in the conduit 50 for heating the backflowing purified outlet gas by opening valve 52, if desired, before the backflowing gas enters the regenerating one of the first and second adsorption bed vessels 20, 20A. A conduit 57, having a valve 58 interposed therein, interconnects the conduit 29 and the conduit 50 downstream of the heater 56 for selectively partially repressuring one of the first and second adsorption vessels 20, 20A with purified outlet gas after regeneration of the adsorbent material contained in the vessel being regenerated has been completed.

Once the adsorbent material in the adsorption vessels 20, 20A has been regenerated by the pressure reduction and purging steps of the process described above, the regenerated adsorption vessel is partially repressured with purified outlet gas prior to repressuring such adsorption vessel with raw reservoir gas and returning the regenerated adsorption vessel to service. For partial repressuring of the adsorption vessels 20, 20A, with the purified outlet gas stream, the valves 48, 48A are closed, as appropriate. When the pressure in the adsorption vessel being partially repressured increases to a predetermined value above the regenerative pressure, such as about 15 psig above the regenerative pressure, the flow of the purified outlet gas stream into the adsorption vessel is terminated by closing valves 52 or 58, as appropriate. Thereafter, the flow of the raw reservoir gas stream to the other adsorption vessel is terminated and the pressure in the first and second adsorption vessels 20, 20A is substantially equalized. For equalizing of the pressure in the first and second adsorption vessels 20, 20A, a conduit 60 is connected at one end to the conduit 18 of the first adsorption vessel 20 and at its opposed second end to the conduit 18A of the second adsorption vessel 20A to provide fluid communication therebetween. A valve 62 is interposed in the conduit 60. The valve 62 is opened so that the pressure in the first and second adsorption vessels 20, 20A are substantially equalized by allowing gas to flow from the second adsorption vessel 20A to the first adsorption vessel 20 via conduit 60, or visa versa as the case may be. The valve 62 is normally closed during both the adsorption cycle and the regeneration cycle of the first and second adsorption vessels 20, 20A.

For illustration, it is assumed that, during the adsorption cycle of the first adsorption vessel 20, the second adsorption vessel 20A has been regenerated so as to have a fresh adsorption bed available for use while regenerating the first adsorption vessel 20. In effect, the first and second adsorption vessels 20 and 20A are operated in parallel adsorption service flow but out of phase such that regeneration of the adsorbent material in one vessel is accomplished while the adsorbent material in the other vessel still has adsorption capacity.

To begin the regeneration of the first adsorption vessel 20, the second adsorption vessel 20A is placed into service by opening valves 42A and 44 to pass raw reservoir gas to the second adsorption vessel 20A via the conduit 18A and to exhaust a purified outlet gas stream therefrom via the conduit 29A. The valves 42 and 30 are then closed, and the valve 48 is opened. This connects the first adsorption vessel 20 to the inlet of the compressor 12 via the conduit 46, the compressor 49, and the conduit 14, thereby dropping the pressure in the first adsorption vessel 20 to that of the reservoir gas in conduit 14 (or to that of the suction pressure of compressor 49, if employed in the particular application). Next, the valve 52 (or valve 58) and valve 54 are opened, permitting purified outlet gas from the second adsorption vessel 20A via conduits 29A, 29 and 50 (or conduit 57) to backflow through the first adsorption vessel 20 for a sufficient time for regeneration of the adsorbent material in the first adsorption vessel 20 to be completed. Purging at low pressure desorbs the previously adsorbed high molecular weight hydrocarbons and other impurities by reducing the partial pressure of these components on the adsorbent material. If desired, the backflowing gas can be heated via the heater 56. Following the gas backflowing step in the regeneration cycle, the valve 48 is closed so that the purified outlet gas stream flows into the first adsorption vessel 20 via the conduit 50 and is partially repressured with the purified outlet gas stream (such as to a pressure of about 15 psig above the reduced pressure employed to desorb the hydrocarbon materials from the adsorbent material in the first adsorption vessel 20). Following the partial repressuring of the first adsorption vessel 20 with the purified outlet gas stream, valve 52 (or valve 58, if appropriate) and valve 54 are closed so that the flow of the purified outlet gas to the first adsorption vessel 20 is terminated; and the valves 42A and 44 are closed so that flow of the raw reservoir gas to the second adsorption vessel 20A is terminated. The valve 62 is then opened so that the pressure in the first and second adsorption vessels 20, 20A is substantially equalized by allowing gas to flow from the second adsorption vessel 20A to the first adsorption vessel 20 via the conduit 60. Once the pressure in the first and second adsorption vessels 20, 20A has been substantially equalized, the valve 62 is closed and the valve 42 is opened so that the first adsorption vessel 20 is repressurized to its operating pressure with the compressed raw reservoir gas stream from the compressor 12. Following the repressuring of the first adsorption vessel 20, valve 30 is opened so that the first adsorption vessel 20 is returned to adsorption service.

When it becomes necessary to regenerate the second adsorption vessel 20A, a procedure similar to that described above is followed. With the first adsorption vessel 20 placed back into adsorption service, the valves 42A and 44 are closed, and the valve 48A is opened to connect the second adsorption vessel 20A to the compressor suction of the compressor 12 via the conduits 46A, 46, and the compressor 49, thereby dropping the pressure in the second adsorption vessel 20A to that of the reservoir gas. Next, the valve 52 (or valve 58) and valve 54A are opened, permitting purified outlet gas from the first adsorption vessel 20 to backflow through the second adsorption vessel 20A via the conduits 29, 50 (or conduit 57), and 50A for a sufficient time to complete regeneration of the adsorbent material in the second adsorption vessel 20A. If desired, the backflowing gas can be heated via the heater 56. Following this backflowing step, the valves 48A and 52 (or valve 58) are closed and the valve 58 is opened until the second adsorption vessel 20A is partially repressured with purified outlet gas from the first adsorption vessel 20 via the conduits 57 and 50A (such as to a pressure of about 15 psig above the reduced pressure employed to desorb the hydrocarbon materials from the adsorbent material in the second adsorption vessel 20A). Following the partial repressuring of the second adsorption vessel 20A with the purified outlet gas, the valve 52, (or valve 58, if appropriate) and valve 54A are closed so that the flow of the purified outlet gas to the second adsorption vessel 20A is terminated; and the valves 42 and 30 are closed so that the flow of the raw reservoir gas to the first adsorption vessel 20 is terminated. The valve 62 is then opened so that the pressure in the first and second adsorption vessels 20, 20A is substantially equalized by allowing gas to flow from the first adsorption vessel 20 to the second adsorption vessel 20A via the conduit 60. Once the pressure in the first and second adsorption vessels 20, 20A has been substantially equalized, the valve 62 is closed and the valve 42A is opened so that the second adsorption vessel 20A is repressured to its operating pressure with the compressed raw reservoir gas stream from the compressor 12. Following the repressuring of the second adsorption vessel 20A, valve 44 is opened so that the second adsorption vessel 20A is returned to adsorption service.

While the various valves have been discussed as manual valves, it will be understood that conventional motorized valves may be provided and appropriate timing mechanisms may be provided to automatically control the switching and regeneration of the adsorption material in the first and second adsorption vessels 20, 20A. Further, while it is believed that the greatest benefit will be for purifying and enriching gas as fuel for reciprocating type of engines, it will be recognized that the present invention is not limited by the type of engine and compressor used.

FIG. 2 shows an elevational view of the volume accumulator vessel 32 with a portion cut away to show part of the inside thereof. The volume accumulator vessel 32 comprises a substantially closed body 70 having an inlet conduit 72 and an outlet conduit 74. The arrows 76 and 78 indicate the entering and exiting gas flow directions respectively. A hollow, perforated standing pipe 80 is connected to the inlet conduit 72 and its perforations 82, some of which are shown, serve to disperse the entering gas such that intimate mixing is achieved in the accumulator vessel 32. The end of the standing pipe 80 is sealed via a cap 84 that is welded thereon. The inlet and outlet conduit locations may be changed on the accumulator vessel 32 and on any of the vessels discussed hereinbelow.

Figures 3A, 3B:
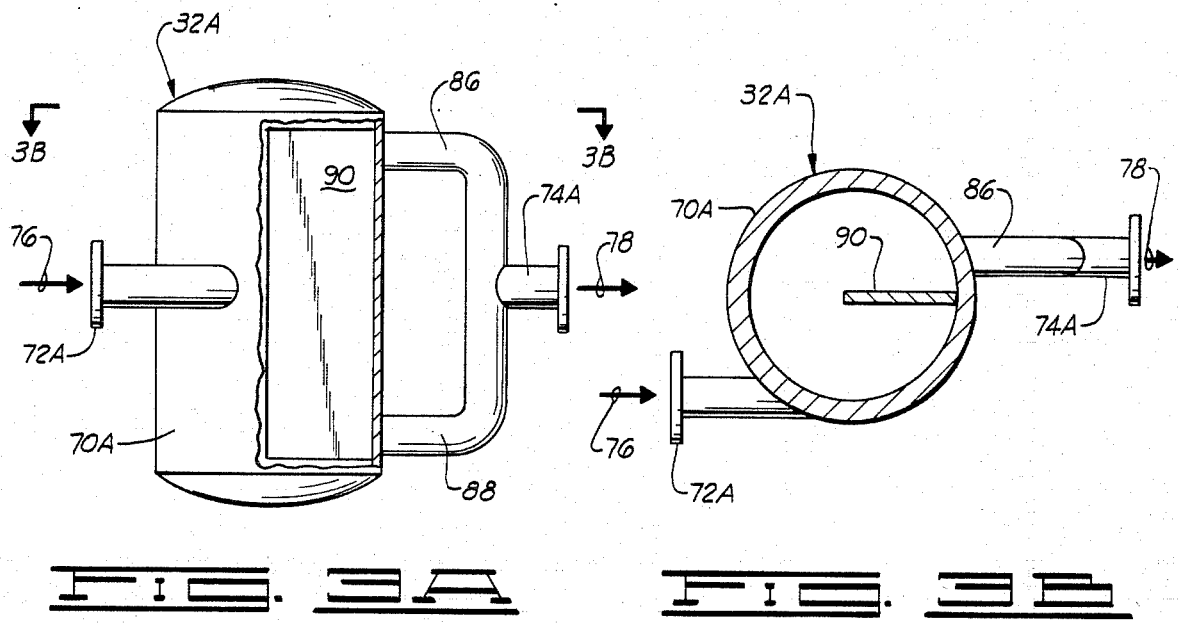
FIG. 3A is a partial cutaway, elevational view of another embodiment of a volume accumulator vessel.
FIG. 3B is a view taken at 3B—3B in FIG. 3A.

FIG. 3A shows an elevational view of another embodiment of a volume accumulator vessel 32A with a cutaway portion removed. The volume accumulator vessel 32A comprises a substantially closed body 70A having an inlet conduit 72A and an outlet conduit 74A, the outlet conduit 74A having an upper branch 86 and a lower branch 88. A vertically extending internal baffle 90 is supported along the inner wall of the volume accumulator vessel 32A. As shown in FIG. 3B, the inlet conduit 72A is disposed substantially tangentially to the closed body 70A. Gas entering the inlet conduit 72A is directed along the inner wall of the accumulator vessel 32A and strikes the baffle 90 to achieve intimate mixing prior to exiting via the upper and lower branch conduits 86, 88 of the outlet conduit 74A. The openings of the inlet conduit 72A and the outlet conduit 74A are disposed on the opposite side of the baffle 90.

FIG. 4 shows an elevational view of yet another embodiment of a volume accumulator vessel 32B with a portion cutaway to show part of the inside thereof. The volume accumulator vessel 32B comprises a substantially closed body 70B having an inlet conduit 72B and an outlet conduit 74B. An internal conduit 92 connects with the inlet conduit 72B and has a downwardly directed leg 94. At the end of leg 94 is a conventional eductor 96 designed to increase the velocity of the entering gas which effects intimate mixing of the gas prior to its exiting the volume accumulator vessel 32B via the outlet conduit 74B.

Figure 5:
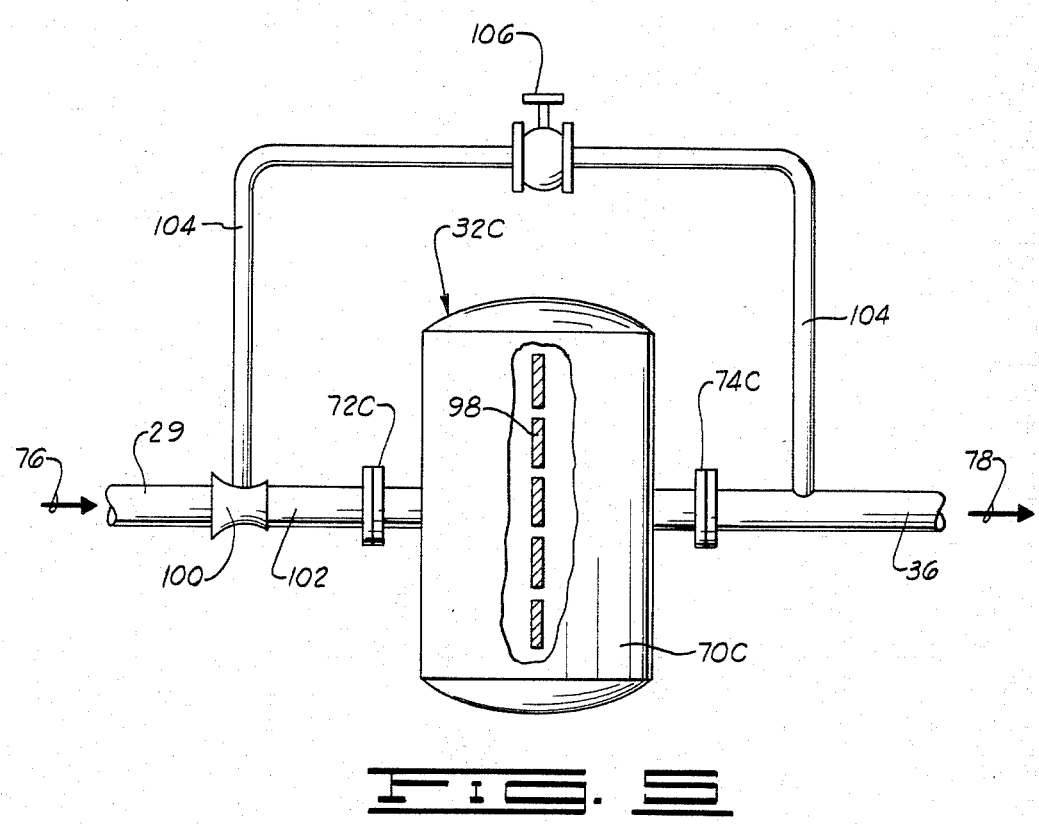
FIG. 5 is a partial cutaway, elevational view of one other embodiment of a volume accumulator vessel.
Figure 5:
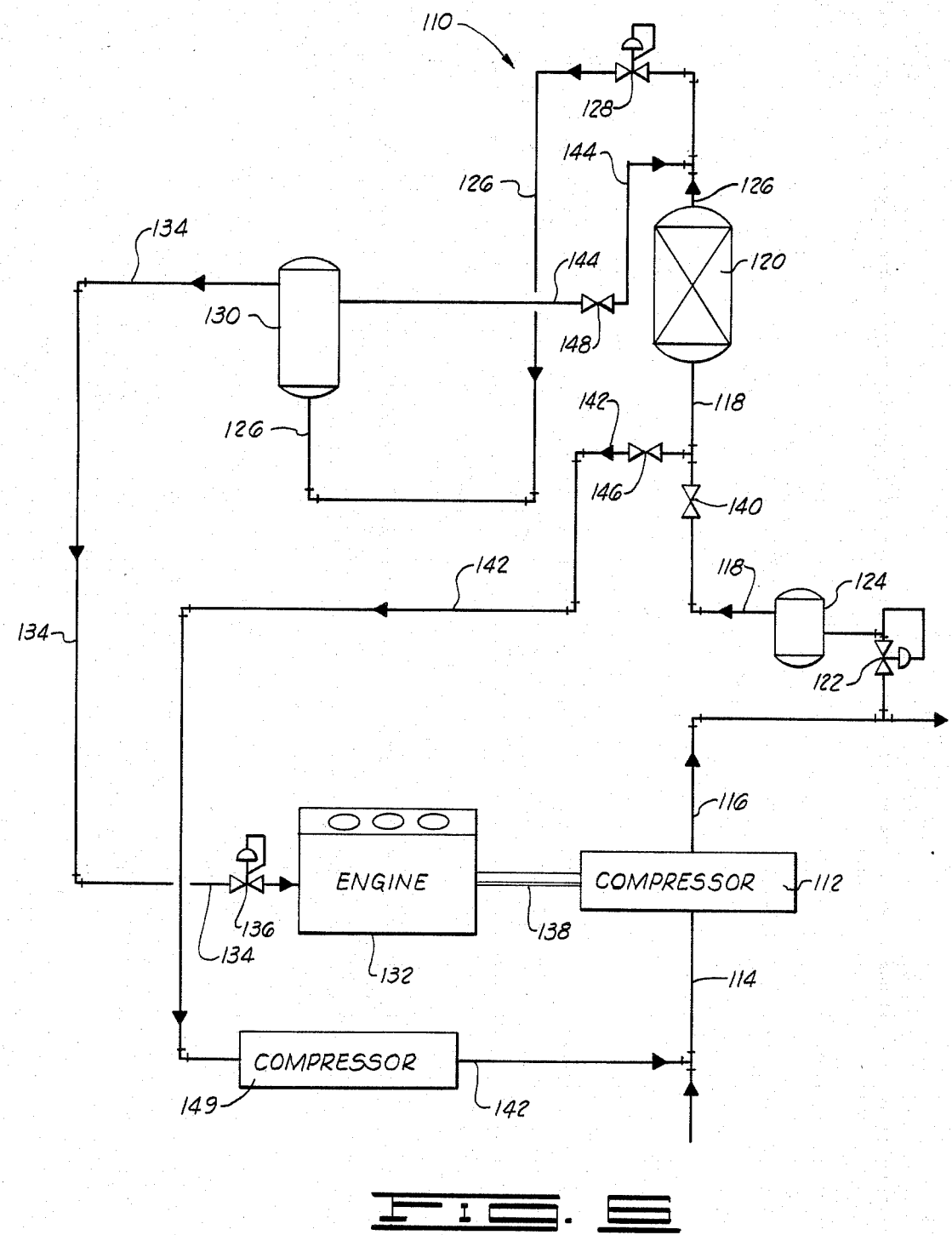

FIG. 5 shows an elevational view of one other volume accumulator vessel 32C with a portion cutaway. The volume accumulator vessel 32C comprises a substantially closed body portion 70C having an inlet conduit 72C and an outlet conduit 74C. A vertically standing, perforated baffle 98 is supported within the closed body portion 70C and is disposed between the inlet and the outlet conduits 72C, 74C. The conduit 29, when the volume accumulator vessel 32C is used in the fuel conditioning process 10, is connected to an externally disposed eductor 100, the constricted end of which is connected to a conduit 102 which in turn connects to the inlet conduit 72C. The conduit 36 is connected to the outlet conduit 74C, and a backflow conduit 104 interconnects the conduit 36 and the eductor 100. A valve 106 is interposed in the conduit 104. Gas passing through the conduit 29 flows through the eductor 100, increasing in velocity thereby and inducing backflow through the backflow conduit 104 from the gas exiting via conduit 36. Intimate mixing is effected by the recycling and velocity increase of the gas interacting with the internal perforated baffle 98.

FIG. 6 illustrates a schematic flow diagram of a second embodiment of a fuel conditioning process 110 of the present invention. In this embodiment raw unprocessed natural gas at a relatively low pressure enters compressor 112 via a conduit 114. The compressed gas exits the compressor 112 via a conduit 116. A portion of the compressed gas is withdrawn from the conduit 116 via a conduit 118 and flows to an adsorption vessel 120. If required, a pressure reducing regulator 122 and a knockout drum 124 may be interposed in the conduit 118 to control the pressure of the gas to the adsorption vessel 120 and to collect entrained liquids in the compressed gas in order to prevent liquids in the compressed gas from being carried into the adsorption vessel 120.

The fuel portion of the raw unprocessed natural gas passes through the adsorption vessel 120 and passes therefrom via a conduit 126 as a substantially pure outlet gas stream. The adsorption vessel 120 is of conventional design for holding a solid adsorbent material, typically activated carbon, capable of selectively adsorbing heavy hydrocarbon components and other impurities, such as hydrogen sulfide, from the raw unprocessed natural gas derived from the ground reservoir. A pressure regulator valve 128 is provided in the conduit 126 and is normally open during the adsorption cycle of the adsorption vessel 120, with the substantially pure outlet gas stream passing via the conduit 126 to a volume accumulator vessel 130 which serves to accumulate and mix the purified outlet gas stream and provide a substantially uniform accumulator effluent. The accumulator effluent flows to an engine 132 via a conduit 134 which has one or more fuel regulator valves 136 (one of which is shown) of conventional design to regulate the flow rate of the accumulator effluent as required to power the engine 132. The engine 132 is power connected to the compressor 112 via a drive shaft 138. A valve 140 is disposed in conduit 118 to selectively isolate the adsorption vessel 120 as required for regeneration service. As previously stated, while it is believed that the greatest benefit will be for purifying and enriching gas as fuel for a reciprocating type of engine, the present invention should not be construed as being limited by the type of engine used. For example, the engine may be any suitable fuel burning engine known in the art, including internal drive engines and the like.

The product gas stream which flows from the adsorption vessel 120 will vary in composition during the adsorption cycle—from beginning at a time when the adsorption vessel 120 is first placed into its adsorption mode until the adsorbent material in the adsorption vessel 120 begins to approach saturation. Typically, the net heat content of the purified outlet gas stream, having been stripped of its higher molecular weight hydrocarbon components by the adsorbent material in the adsorption vessel 120 may vary, for example, from 950 BTU per SCF to 1050 BTU per SCF as it leaves the adsorption vessel 120. This wide variation in fuel heat content will result in poor engine performance. This variation can be reduced to less than 25 BTU per SCF by the accumulation and mixing achieved by the volume accumulator vessel 130, which is identical in construction to the vessel 32 which has been described in detail hereinabove. The accumulator vessel 130 provides a constant fuel flow to the engine 132 when the adsorbent material in the adsorption vessel 120 is being regenerated, and also provides sufficient flow of accumulator effluent to purge and partially repressure the adsorption vessel 120 during regeneration of the adsorbent material contained therein.

Regeneration of the adsorption vessel 120 is accomplished by pressure reduction and purging with the accumulator effluent. A conduit 142 is connected to the conduit 118 downstream of the valve 140, the distal end of the conduit 142 being connected to the conduit 114 to provide fluid communication between the adsorption vessel 120 and the inlet to the compressor 112. If desired, a compressor 149 can be disposed in the conduit 142 for compressing the gases in the same manner and for the same purpose as described hereinabove for the compressor 49 of FIG. 1. In FIG. 6, a conduit 144 is connected to the conduit 126 upstream to the pressure regulator valve 128, the distal end of the conduit 144 being connected to the volume accumulator vessel 130 to provide fluid communication between the adsorption vessel 120 and the volume accumulator vessel 130 during a portion of the regeneration cycle. Valves 146 and 148 are disposed in conduits 142 and 144, respectively, the valves 146 and 148 being closed when the adsorption vessel 120 is in its adsorption mode, the valves 146, 148 being open during selected portions of the regeneration of the adsorption vessel 120 as will be more fully described hereinafter.

To begin the regeneration of the adsorption vessel 120, the valve 140 is closed and valve 146 is opened. This connects the adsorption vessel 120 to the inlet of the compressor 112 via conduit 142 and the conduit 114, thereby dropping the pressure in the adsorption vessel 120 to a preselected pressure for the desorption of the heavy hydrocarbon and other impurities from the adsorbent material in the adsorption vessel 120. Valve 128 closes when the pressure in the bed drops below the set pressure of the valve. This would be immediately after the start of the depressure step. Next, the valve 148 is opened, permitting accumulator effluent from the volume accumulator vessel 130 to backflow through the adsorption vessel 120 via conduits 144 and 126 to the suction side of the compressor 112 via conduits 142 and 114 (and compressor 149, if provided) for a sufficient time for regeneration of the adsorbent material in the adsorption vessel 120 to be completed. If desired, the backflowing accumulator effluent can be heated via a heater in conduit 144 (not shown). Following the accumulator effluent backflowing step in the regeneration cycle, the valve 146 is closed so that accumulator effluent flows into the adsorption bed vessel 120 via conduits 144 and 126 so as to increase the pressure in the adsorption vessel 120 until the pressure of the adsorption vessel 120 is substantially equalized to the pressure in the volume accumulator vessel 130. Once the pressure in the adsorption vessel 120 and the volume accumulator vessel 130 have been substantially equalized, the valve 148 is closed and the valve 140 is opened so that the adsorption vessel 120 is repressurized to its operating pressure with the compressed raw reservoir gas stream from the compressor 112. When the pressure in the adsorption vessel 120 approaches its operating pressure, the pressure regulator valve 128 is opened so that product gas can flow from the adsorption vessel 120 to the volume accumulator vessel 130 via conduit 126. While the various valves have been discussed as manual valves, it will be understood that conventional motorized valves may be provided and appropriate timing mechanisms may be provided to automatically control the switching of the adsorption vessel 120 between the adsorption mode and the regeneration mode.

The present invention discloses a process whereby the fuel supply to an internal combustion engine is substantially purified and stabilized by use of the differential pressure available from the difference between the suction and discharge pressures of a compressor which is driven by such engine. It should be recognized that the process disclosed requires high and low pressure sources for adsorption and desorption but is not limited to having those pressure sources supplied from a compressor nor is the use of the fuel limited to internal combustion engines.

It is clear that the present invention is well adapted to carry out the objects and to attain the ends and advantages mentioned as well as those inherent therein. While presently preferred embodiments of the invention have been described for purposes of this disclosure, numerous changes may be made which will readily suggest themselves to those skilled in the art and which are encompassed within the spirit of the invention disclosed and as defined in the appended claims.

What is claimed is:

1. A fuel conditioning process for improving the quality of a fuel portion of a reservoir gas stream, the fuel portion used to fuel an engine driving a compressor which compresses the reservoir gas stream to a pressure sufficient to pass the reservoir gas stream less than the fuel portion thereof to a gas gathering conduit, the process comprising:

passing the fuel portion of the compressed reservoir gas stream through a first adsorption vessel containing an adsorbent material capable of selectively adsorbing impurity compounds present in the reservoir gas stream to produce an outlet gas stream to produce an outlet gas stream suitable for use as a fuel for an internal combustion engine;

passing the outlet gas stream from the first adsorption vessel as fuel to the internal combustion engine which, in the operating mode thereof, powers the gas compressor;

terminating the passage of the reservoir gas to the first adsorption vessel after achieving a predetermined degree of saturation of the adsorbent material by isolating the first adsorption vessel from the compressed reservoir gas stream;

passing the fuel portion of the compressed reservoir gas stream through a second adsorption vessel containing an adsorbent material capable of selectively adsorbing impurity compounds present in the reservoir gas stream to produce an outlet gas stream suitable for use as the fuel for the internal combustion engine;

passing the outlet gas stream from the second adsorption vessel as fuel to the internal combustion engine;

regenerating the adsorbent material in the first adsorption vessel by connecting the first adsorption vessel to the compressor inlet so that the pressure in the first adsorption vessel is lowered;

backflowing a portion of the outlet gas stream from the second adsorption vessel through the first adsorption vessel for a period of time sufficient to substantially desorb the adsorbed impurities from the adsorbent material in the first adsorption vessel;

terminating the backflowing of the outlet gas stream through the first adsorption vessel and partially repressuring the first adsorption vessel with a portion of the outlet gas stream from the second adsorption vessel;

terminating the flow of the outlet gas stream from the second adsorption vessel to the first adsorption vessel;

substantially equalizing the pressure in the first and second adsorption vessels; and passing the compressed reservoir gas stream to the regenerated first adsorption vessel.

2. The fuel conditioning process of claim 1, following the step of passing a portion of the reservoir gas to one of the first and second adsorption vessel, the process further comprising:

accumulating a volume of the outlet gas stream; and mixing the outlet gas stream so that an accumulated effluent stream suitable for use as the fuel for the internal combustion engine is produced, the accumulated effluent stream having an averaged heat content of the outlet gas received from the adsorption vessels.

3. The fuel conditioning process of claim 2 further comprising:

passing the effluent from the regenerating adsorption vessel to the inlet stream of reservoir gas to be compressed therewith and exhausted with the compressor outlet stream of reservoir gas.

4. The fuel conditioning process of claim 3 further comprising:

heating the outlet gas stream from the adsorption vessel operating in the adsorption mode prior to backflowing the outlet gas stream through the adsorption vessel being regenerated.

* * * * *